United States Patent
Zhan

(10) Patent No.: US 8,259,625 B2
(45) Date of Patent: Sep. 4, 2012

(54) METHOD, SYSTEM, AND DEVICE OF VIDEO COMMUNICATION

(75) Inventor: Wuzhou Zhan, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 245 days.

(21) Appl. No.: 12/732,999

(22) Filed: Mar. 26, 2010

(65) Prior Publication Data

US 2010/0182394 A1 Jul. 22, 2010

Related U.S. Application Data

(63) Continuation of application No. PCT/CN2008/072483, filed on Sep. 24, 2008.

(30) Foreign Application Priority Data

Sep. 28, 2007 (CN) .......................... 2007 1 0151406

(51) Int. Cl.
*H04L 12/16* (2006.01)

(52) U.S. Cl. .... 370/266; 370/259; 370/352; 379/202.01; 709/202; 709/204; 709/228

(58) Field of Classification Search .... 348/14.01–14.16; 370/259–271, 351–356; 709/201–207, 217–248; 379/202.01–206.01
See application file for complete search history.

(56) References Cited

U.S. PATENT DOCUMENTS

| 6,593,956 | B1* | 7/2003 | Potts et al. | 348/14.09 |
| 6,624,841 | B1* | 9/2003 | Buchner et al. | 348/14.1 |
| 7,612,793 | B2* | 11/2009 | Potekhin et al. | 348/14.01 |
| 7,864,210 | B2* | 1/2011 | Kennedy | 348/14.08 |
| 2003/0048353 | A1* | 3/2003 | Kenoyer et al. | 348/14.12 |
| 2004/0056885 | A1* | 3/2004 | Azami et al. | 345/723 |
| 2006/0104458 | A1* | 5/2006 | Kenoyer et al. | 381/92 |
| 2007/0064094 | A1 | 3/2007 | Potekhin et al. | |
| 2009/0128617 | A1 | 5/2009 | Zhan | |

FOREIGN PATENT DOCUMENTS

| CN | 1257631 A | 6/2000 |
| CN | 1494801 A | 5/2004 |
| CN | 1929593 A | 3/2007 |
| CN | 1997161 | 7/2007 |
| CN | 101132516 | 7/2010 |

OTHER PUBLICATIONS

First Chinese Office Action issued in corresponding Chinese Patent Application No. 200710151406.X, mailed Oct. 9, 2009.
Extended European Search Report issued in corresponding European Patent Application No. 08800966.7, mailed Nov. 9, 2010.
Written Opinion of the International Searching Authority issued in corresponding PCT Patent Application No. PCT/CN2008/072483, mailed Dec. 18, 2008.
International Search Report issued in corresponding PCT Application No. PCT/CN2008/072483; mailed Dec. 18, 2008.

* cited by examiner

*Primary Examiner* — Hemant Patel
(74) *Attorney, Agent, or Firm* — Brinks Hofer Gilson & Lione

(57) ABSTRACT

A method, a system, and a device of video communication are provided. A sub-picture in a synthetic picture corresponding to each audio stream received is marked. Position information of each audio stream is obtained according to a position of each sub-picture in the synthetic picture. The audio stream and the corresponding position information are sent to a terminal. The terminal processes an audio signal according to the received position information of the audio stream, so that the audio stream carries the position information. During the video communication, the terminal receives the audio stream and the position information, and performs position information sense processing to the audio stream according to the position information. This reduces the frequent communication between the terminal and a device for processing position information and improves the flexibility of the system.

12 Claims, 9 Drawing Sheets

METHOD, SYSTEM, AND DEVICE OF VIDEO COMMUNICATION

CROSS-REFERENCE TO RELATED APPLICATIONS

This application is a continuation of International Application No. PCT/CN2008/072483, filed on Sep. 24, 2008, which claims priority to Chinese Patent Application No. 200710151406.X, filed on Sep. 28, 2007, both of which are hereby incorporated by reference in their entireties.

FIELD OF THE TECHNOLOGY

The present invention relates to the field of communications technology, and more particularly to a method, a system, and a device of video communication.

BACKGROUND OF THE INVENTION

With the popularity of televisions, users have increasingly high requirements for a size of a television screen. Some video communication systems even adopt a projector or a television wall for displaying. In this case, if one picture is synthesized by at least two sub-pictures, positions of speakers in different sub-pictures are quite different when the requirements for a screen size are low. However, in a current multimedia communication system, positions where the sounds are made are not varied according to the changes of the positions of the speakers. This results in the mismatch between position information of the sound and the sub-picture, and thus affects the reality sense of video communication.

In the conventional art, a video conference system includes devices such as a Multipoint Control Unit (MCU), a single sound channel terminal, a multi-channel terminal having at least two sound channels. After the terminals and the MCU are connected, the terminals report configuration situations including positions and quantity of loudspeakers to the MCU. The MCU allocates quantity of sound channels for each terminal according to the configuration situations of the loudspeakers in the terminal. For example, if the terminal only has one loudspeaker, a single channel is allocated. If the terminal has two loudspeakers, two sound channels are allocated. If the terminal has four loudspeakers, four sound channels are allocated. During the conference, the MCU receives video streams and audio streams from each endpoint, combines the video streams into one multi-picture, and sends the multi-picture to the terminals. The audio stream is generated according to the configuration situations of sound channels in each terminal. For example, a terminal 1 has four sound channels, so that four audio streams are generated for the terminal 1, and each audio stream corresponds to one loudspeaker of the terminal 1. The audio stream is usually generated in a manner of adjusting amplitude and time delay. After being processed in such a manner, in the terminal 1, it is felt that the sound is produced from a position of a speaker in the picture, and thus a sense of the position information of the sound is produced.

In the research and implementation of the conventional art, the inventor found that the conventional art at least has the following problems. The MCU has to learn about the configuration situation of loudspeakers before generating a corresponding number of audio streams according to the number of the loudspeakers. In this way, a relationship between the MCU and the terminals becomes too close, thus causing insufficient flexibility.

SUMMARY OF THE INVENTION

The embodiments of the present invention are directed to a method, a system, and a device of video communication, which are applicable to reduce a close relationship between an MCU and terminals and improve flexibility.

To solve the technical problems, the embodiments of the present invention are implemented through the following technical solutions.

In an embodiment, the present invention provides a method of video communication, which includes the following steps.

A sub-picture in a synthetic picture corresponding to each received audio stream is marked.

Position information of each audio stream is obtained according to a position of each sub-picture in the synthetic picture.

The audio stream and the corresponding position information are sent to a terminal, and then the terminal processes an audio signal according to the received position information of the audio stream, so that the audio stream carries the position information.

In another embodiment, the present invention provides a computer program product. The computer program product includes computer program codes. When the computer program codes are executed by a computer, the computer program codes may instruct the computer to perform any step in the method of video communication.

In another embodiment, the present invention provides a computer readable storage medium. The computer readable storage medium stores computer program codes. When the computer program codes are executed by a computer, the computer program codes may instruct the computer to perform any step in the method of video communication.

In still another embodiment, the present invention provides a system of video communication, which includes a marking unit, an obtaining unit, a sending unit, and a terminal unit.

The marking unit is adapted to mark a sub-picture in a synthetic picture corresponding to each received audio stream.

The obtaining unit is adapted to obtain position information of each audio stream according to a position of each sub-picture in the synthetic picture.

The sending unit is adapted to send the audio stream and the corresponding position information.

The terminal unit is adapted to process an audio signal according to the received position information, so that the audio stream carries position information.

In another embodiment, the present invention provides a device for video communication, which includes a marking unit, an obtaining unit, and a sending unit.

The marking unit is adapted to mark a sub-picture in a synthetic picture corresponding to each received audio stream.

The obtaining unit is adapted to obtain position information of each audio stream according to a position of each sub-picture in the synthetic picture.

The sending unit is adapted to send the audio stream and the corresponding position information.

As seen from the technical solutions, the sub-picture in the synthetic picture corresponding to each received audio stream is marked, the position information of each audio stream is obtained, and the audio stream and the corresponding position information are sent to the terminal. Therefore, the configuration situation of loudspeakers in the terminal does not need to be known. The terminal processes the audio signal according to the received position information of the audio stream, so that the audio stream carries the position informa-

DETAILED DESCRIPTION OF THE EMBODIMENTS

The embodiment of the present invention provides a method, a system, and a device of video communication to increase the system flexibility during video communication. To make the objectives, technical solutions, and advantages of the present invention more comprehensible, the present invention is further illustrated below in detail with reference to the accompanying drawings and the embodiments.

Figure 1:
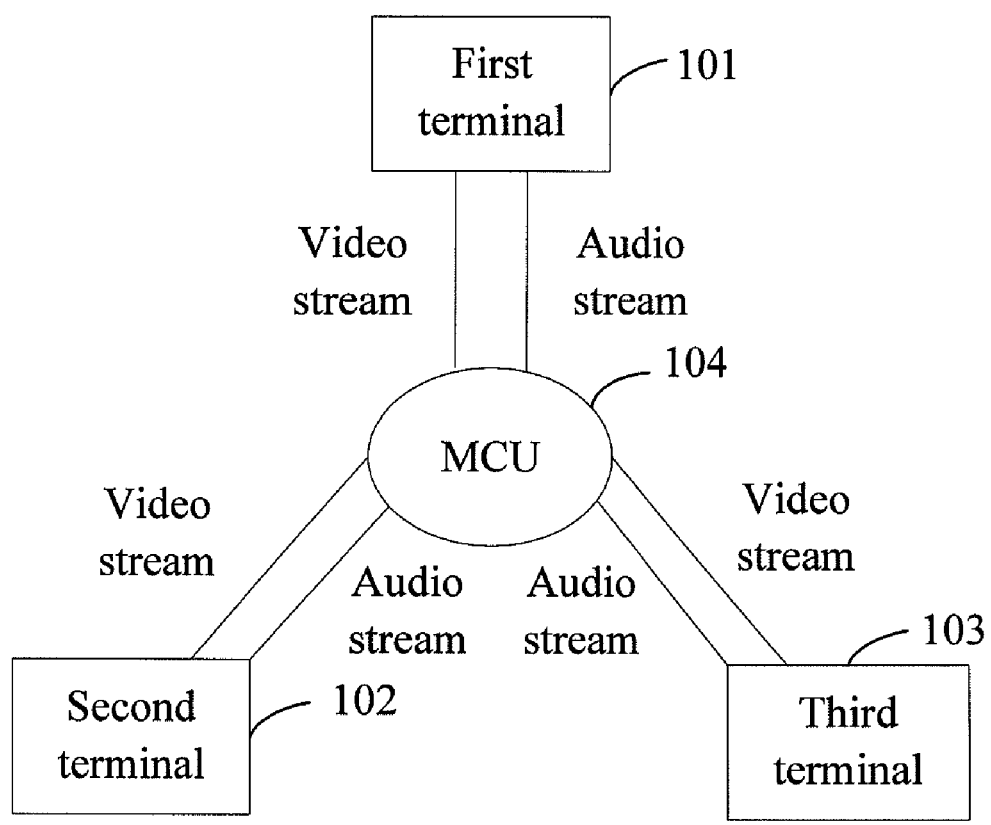
FIG. 1 is a diagrammatic sketch of a video conference system according to an embodiment of the present invention.

FIG. 1 is a diagrammatic sketch of a video conference system according to an embodiment of the present invention. Referring to FIG. 1, a first terminal 101, a second terminal 102, and a third terminal 103 send video streams and audio streams thereof to an MCU 104 separately. The MCU processes the received video streams and audio streams and sends the processed audio streams and video streams to the first terminal 101, the second terminal 102, and the third terminal 103.

The process that the MCU processes the received video streams and audio streams is illustrated below.

Figure 2:
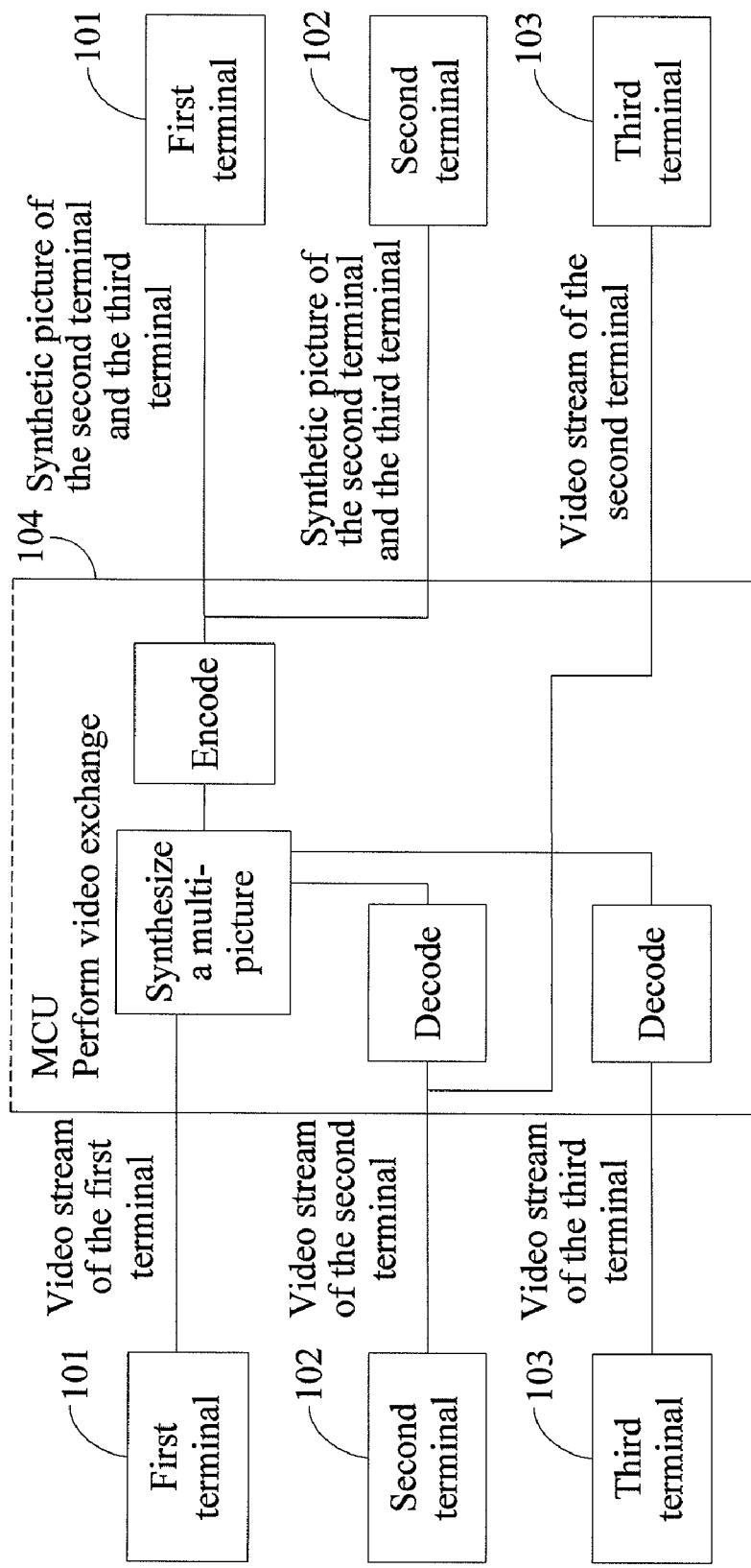
FIG. 2 is a schematic diagram of video processing according to an embodiment of the present invention.

FIG. 2 is a schematic diagram of video processing according to an embodiment of the present invention. Referring to FIG. 2, for example, the first terminal 101 requests to watch a picture synthesized by the second terminal 102 and the third terminal 103, the second terminal 102 requests to watch a picture synthesized by the second terminal 102 and the third terminal 103, and the third terminal 103 requests to watch a video of the second terminal 102. According to these requests, the MCU 104 directly forwards a video stream of the second terminal 102 to the third terminal 103, and additionally decodes the video streams of the second terminal 102 and the third terminal 103, synthesizes a multi-picture, encodes the multi-picture, and sends the encoded multi-picture to the first terminal 101 and the second terminal 102. When the multi-picture is synthesized, a resolution of each terminal video signal in the multi-picture needs to be adjusted according to the requirements. For example, for a multi-picture synthesized with the second terminal 102 at a left sub-picture and the third terminal 103 at a right sub-picture, resolutions of the second terminal 102 and the third terminal 103 in a horizontal direction may be reduced by one half, so that the resolution of the synthesized multi-picture maintains unchanged. For a virtual conference system or other occasions with higher requirements for the resolution, the resolutions of the second terminal 102 and the third terminal 103 may not be reduced. Instead, the two video signals are bonded together in the horizontal direction, so that the synthesized multi-picture signal has a resolution twice as much as the original resolution.

The MCU 104 decodes the audio stream of each terminal, performs audio mixing, encodes the mixed sound, and sends the encoded audio signal to the terminal. During audio mixing, generally, the sound of the terminal itself is not mixed. For example, the MCU 104 performs audio mixing on audio streams of the second terminal 102 and the third terminal 103, encodes the mixed audio streams, and sends the encoded audio streams to the first terminal 101. The MCU 104 performs audio mixing on audio streams of the first terminal 101 and the third terminal 103, encodes the mixed audio streams, and sends the encoded audio streams to the second terminal 102. The MCU 104 performs audio mixing on audio streams of the first terminal 101 and the second terminal 102, encodes the mixed audio streams, and sends the encoded audio streams to the third terminal 103.

Figure 3:
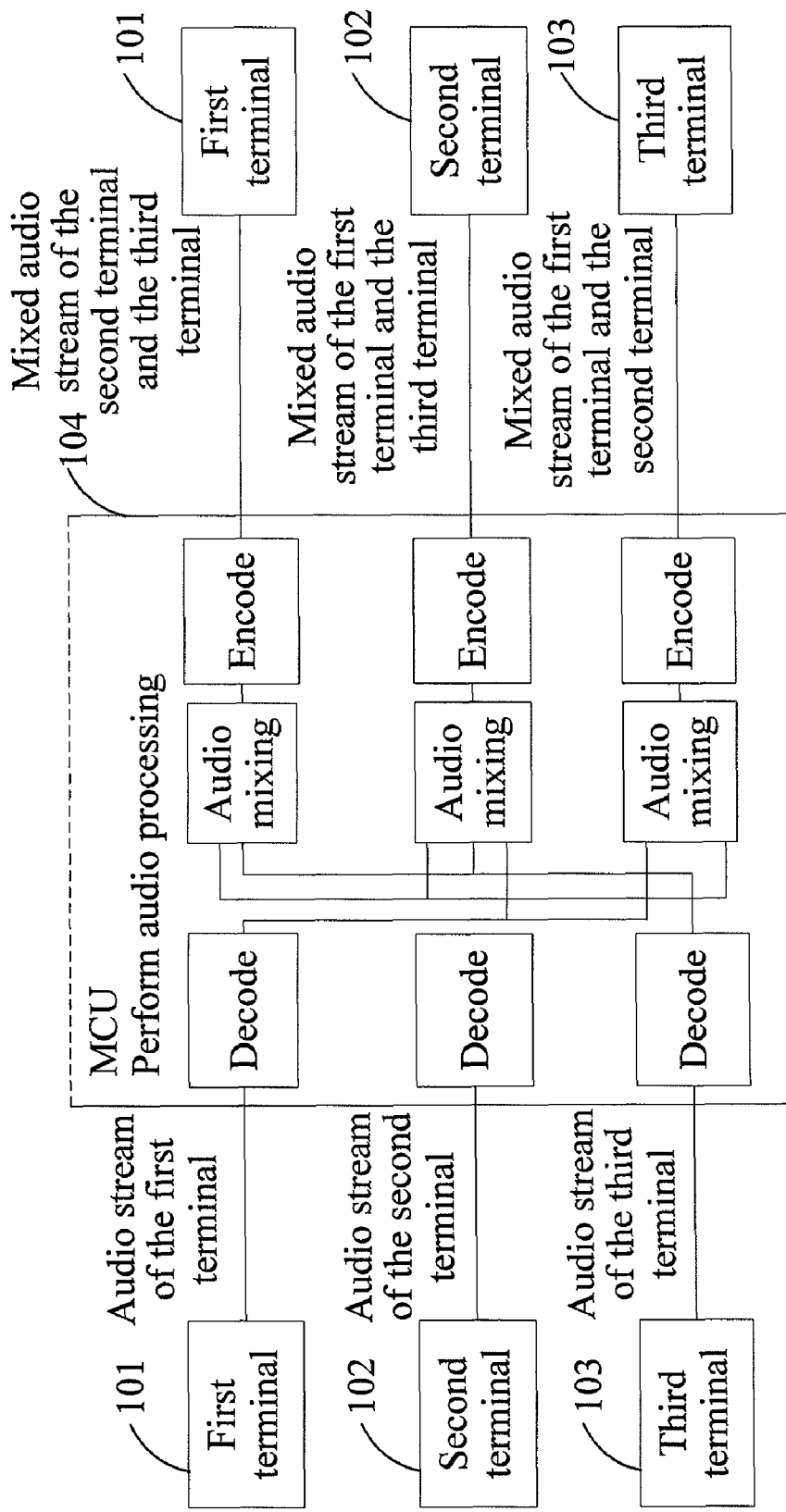
FIG. 3 is a schematic diagram of audio processing according to an embodiment of the present invention.

FIG. 3 is a schematic diagram of audio processing according to an embodiment of the present invention. Referring to FIG. 3, the first terminal 101, the second terminal 102, and the third terminal 103 send audio streams to the MCU 104. The MCU 104 receives the audio streams of the terminals, decodes the audio streams, performs audio mixing on the decoded audio streams, encodes the mixed audio streams, and sends the encoded audio streams to each terminal separately. For example, an audio-mixed stream of the second terminal 102 and the third terminal 103 is sent to the first terminal 101, an audio-mixed stream of the first terminal 101 and the third terminal 103 is sent to the second terminal 102, and an audio-mixed stream of the first terminal 101 and the second terminal 102 is sent to the third terminal 103.

The method of the present invention is illustrated as follows in detail with reference to the schematic diagrams and diagrammatic sketches.

Figure 5:
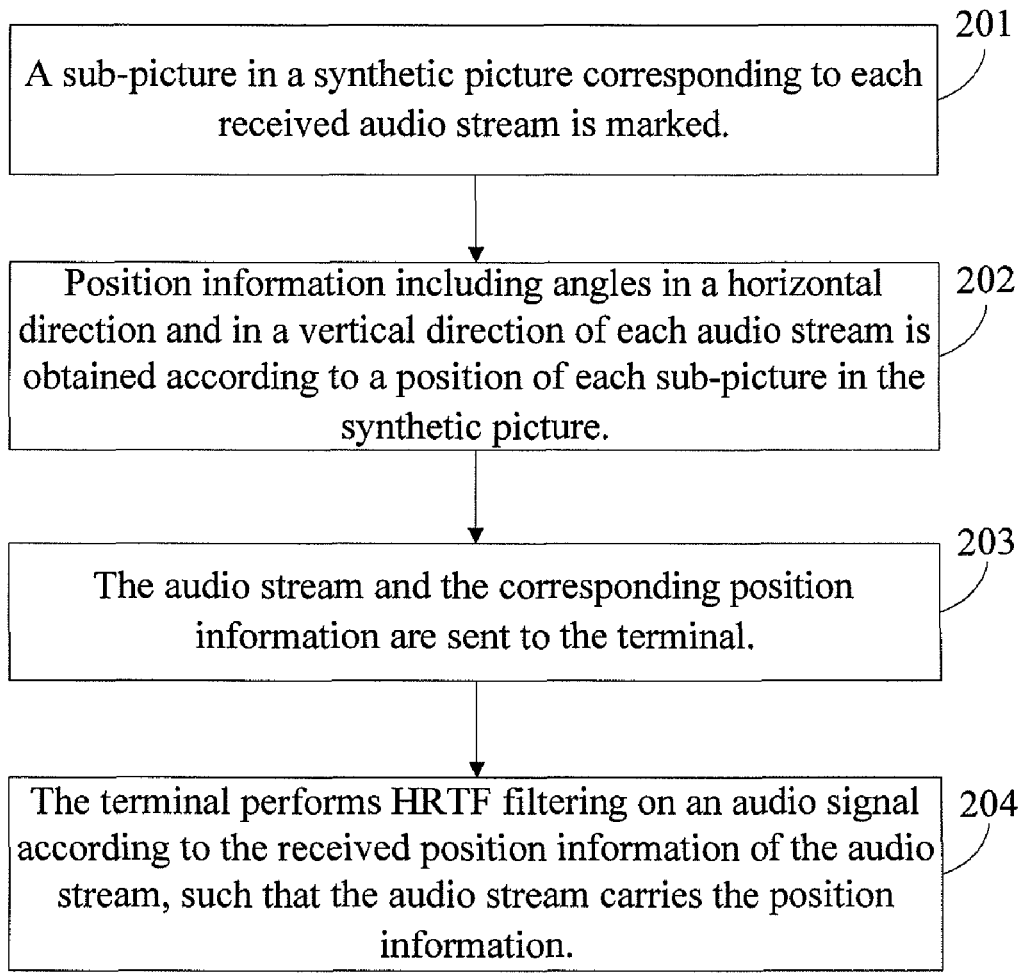
FIG. 5 is a flow chart of a method according to a first embodiment of the present invention.

FIG. 5 is a flow chart of a method according to a first embodiment of the present invention.

In step 201, a sub-picture in a synthetic picture corresponding to each received audio stream is marked. The received audio streams and the synthetic picture are illustrated in the following.

In Example 1, a video stream that the MCU sends to the first terminal is a synthetic picture of the second terminal and the third terminal, in which the second terminal is at a left sub-picture and the third terminal is at a right sub-picture. An audio stream that the MCU sends to the first terminal includes an audio stream of the second terminal and an audio stream of the third terminal, in which the audio stream for marking the second terminal corresponds to the left sub-picture and the audio stream of the third terminal corresponds to the right sub-picture. In Example 2, a video stream that the MCU sends to the second terminal is a synthetic picture of the second terminal and the third terminal. An audio stream that the MCU sends to the second terminal includes an audio stream of the first terminal and an audio stream of the third terminal, in which the audio stream for marking the third terminal corresponds to the right sub-picture, but the audio stream of the first terminal has no corresponding sub-picture, and the audio stream for marking the first terminal is voiceover or serves as other marks except the voiceover.

In Example 3, a video stream that the MCU sends to the third terminal is the video stream of the second terminal, and an audio stream that the MCU sends to the third terminal includes the audio stream of the first terminal and the audio stream of the second terminal. Thus, the third terminal watches a single picture of the second terminal. The single picture is regarded as a special case for the synthetic picture. The audio stream for marking the second terminal corresponds to the single picture and the audio stream of the first terminal is marked as voiceover.

In step 202, position information including angles in a horizontal direction and in a vertical direction of each audio stream is obtained according to a position of each sub-picture in the synthetic picture.

In step 203, the audio stream and the corresponding position information are sent to the terminal. For example, the audio stream that the MCU sends to the first terminal includes the audio stream of the second terminal and the audio stream of the third terminal. The audio stream of the second terminal is placed at a first sound channel. The audio stream of the third terminal is placed at a second sound channel. In addition, if the MCU sends a large amount of audio streams to a certain terminal, to reduce a code rate, the audio stream having the highest energy is placed at a first sound channel, and the audio stream having the second highest energy is placed at a second sound channel. Then, the other audio streams are decoded, audio mixed, and encoded into one audio stream for being placed at a third sound channel.

The position information is sent to the terminal directly or transferred to an audio stream combining unit. The audio stream combining unit inserts the position information in the audio stream and sends the position information together with the audio stream to the terminal.

In step 204, the terminal performs head related transfer function (HRTF) filtering on an audio signal according to the received position information of the audio stream, so that the audio stream carries the position information.

In this embodiment, the position information is represented by the angles in the horizontal direction and the vertical direction and the filtering adopts the HRTF.

Figure 6:
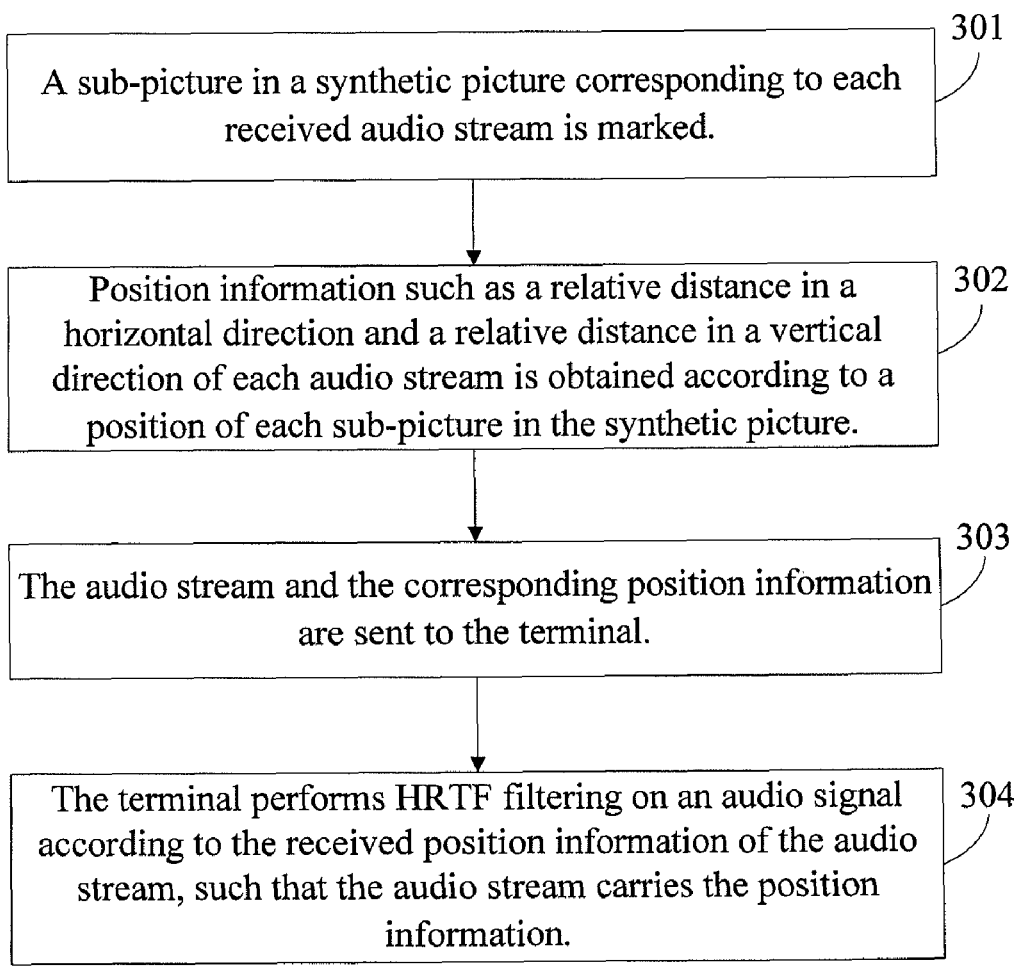
FIG. 6 is a flow chart of a method according to a second embodiment of the present invention.

FIG. 6 is a flow chart of a method according to a second embodiment of the present invention.

In step 301, a sub-picture in a synthetic picture corresponding to each received audio stream is marked. The received audio streams and the synthetic picture are demonstrated below by examples.

In Example 1, a video stream that the MCU sends to the first terminal is a synthetic picture of the second terminal and the third terminal, in which the second terminal is at a left sub-picture and the third terminal is at a right sub-picture. An audio stream that the MCU sends to the first terminal includes an audio stream of the second terminal and an audio stream of the third terminal, in which the audio stream for marking the second terminal corresponds to the left sub-picture and the audio stream of the third terminal corresponds to the right sub-picture. In Example 2, a video stream that the MCU sends to the second terminal is a synthetic picture of the second terminal and the third terminal. An audio stream that the MCU sends to the second terminal includes an audio stream of the first terminal and an audio stream of the third terminal, in which the audio stream for marking the third terminal corresponds to the right sub-picture, but the audio stream of the first terminal has no corresponding sub-picture, and the audio stream for marking the first terminal is voiceover or serves as other marks except the voiceover. For example, the audio stream is marked as an audio stream when no picture is displayed.

In Example 3, a video stream that the MCU sends to the third terminal is the video stream of the second terminal. An audio stream that the MCU sends to the third terminal includes the audio stream of the first terminal and the audio stream of the second terminal. Thus, the third terminal watches a single picture of the second terminal. The single picture is regarded as a special case for the synthetic picture. The audio stream for marking the second terminal corresponds to the single picture and the audio stream of the first terminal is marked as voiceover.

Figure 4:
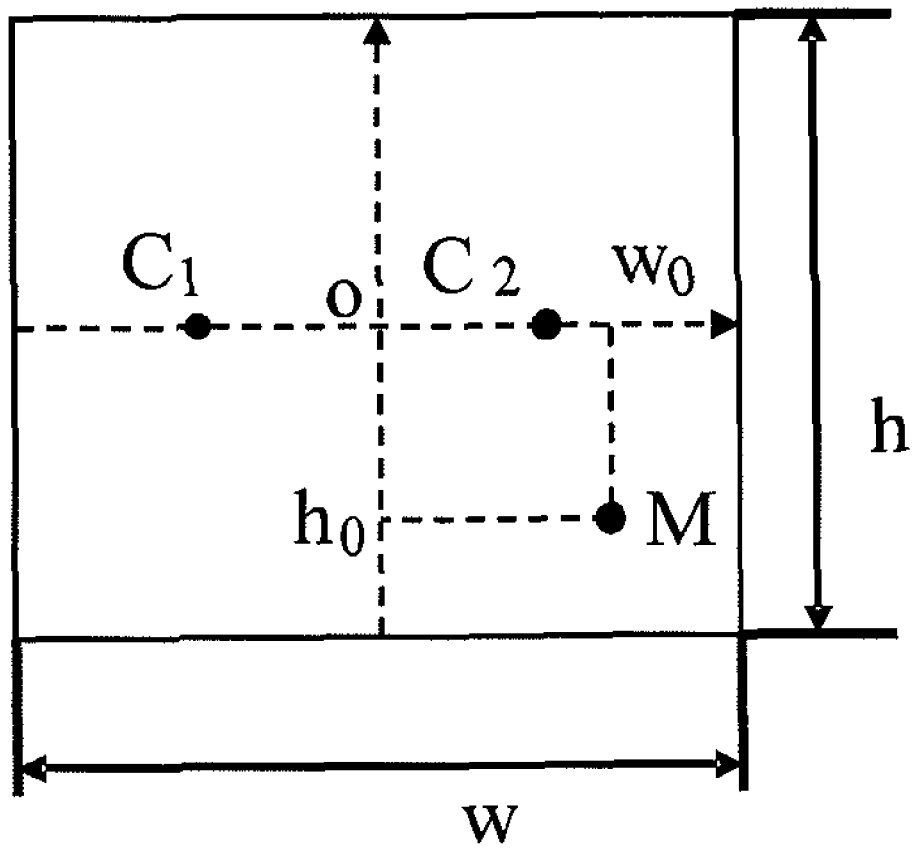
FIG. 4 is a diagrammatic sketch of relative positions according to an embodiment of the present invention.

In step 302, position information such as a relative distance in a horizontal direction and a relative distance in a vertical direction of each audio stream is obtained according to a position of each sub-picture in the synthetic picture. The representation manner of the relative distances is as shown in FIG. 4. The audio stream that participates in the audio mixing carries no position information itself. The point o is a central point of a video image, w is a width of the image, and h is a height of the image. A coordinate system is established with the point o as an origin. Thus, the point M in the image has coordinates (w0, h0). The w' and h' represent relative distances of the point M in the horizontal direction and in the vertical direction respectively, and the following equations may be adopted for calculation:

$$w'=w0/(w/2) \quad (1)$$

$$h'=h0/(h/2) \quad (2)$$

An audio stream sent to a terminal 1 is a mixed audio of a terminal 2 and a terminal 3, in which an audio stream of the terminal 2 that participates in the audio mixing corresponds to a left sub-picture, and an audio stream of the terminal 3 that participates in the audio mixing corresponds to a right sub-picture. The central point of the left sub-picture is C1 and the central point of the right sub-picture is C2. Therefore, position information of the audio streams of the terminal 2 and the terminal 3 may be represented by relative distances of the points C1 and C2 in the horizontal direction and in the vertical direction respectively. That is, the position information of the audio stream of the terminal 2 is (−0.5, 0), and the position information of the audio stream of the terminal 3 is (0.5, 0). In a previous step, voiceover is mentioned. For the audio stream serving as the voiceover, the position information thereof may be set as (−1, 0) or (1, 0). For the audio stream corresponding to the single picture, the position information thereof is (0, 0). If the audio stream that participates in the audio mixing carries position information, the position information is calculated in the following manner. Assume that the audio streams of the terminal 2 and the terminal 3 are mixed and respectively correspond to the left sub-picture and the right sub-picture, and the position information of the audio streams of the terminal 2 and the terminal 3 themselves are (w'2, h'2) and (w'3, h'3) respectively. The new position information thereof should be (−0.5+(w'2/2), h'2) and (0.5+(w'3/2), h'3).

In step 303, the audio stream and the corresponding position information are sent to the terminal. For example, the audio stream that the MCU sends to the first terminal includes the audio stream of the second terminal and the audio stream of the third terminal. The audio stream of the second terminal is placed at a first sound channel. The audio stream of the third terminal is placed at a second sound channel. In addition, if the MCU sends a large amount of audio streams to a certain terminal, in order to reduce a code rate, the audio stream having the highest energy is placed at a first sound channel, and the audio stream having the second highest energy is placed at a second sound channel, and then the other audio streams are decoded, audio mixed, and encoded into one audio stream for being placed at a third sound channel.

The position information may be sent to the terminal directly. The position information may also be inserted in the audio stream and sent to the terminal together with the audio stream.

In step 304, the terminal performs HRTF filtering on an audio signal according to the received position information of the audio stream, so that the audio stream carries the position information.

In this embodiment, the position information is represented by a relative distance in a horizontal direction and a relative distance in a vertical direction and the filtering adopts the HRTF.

Figure 7:
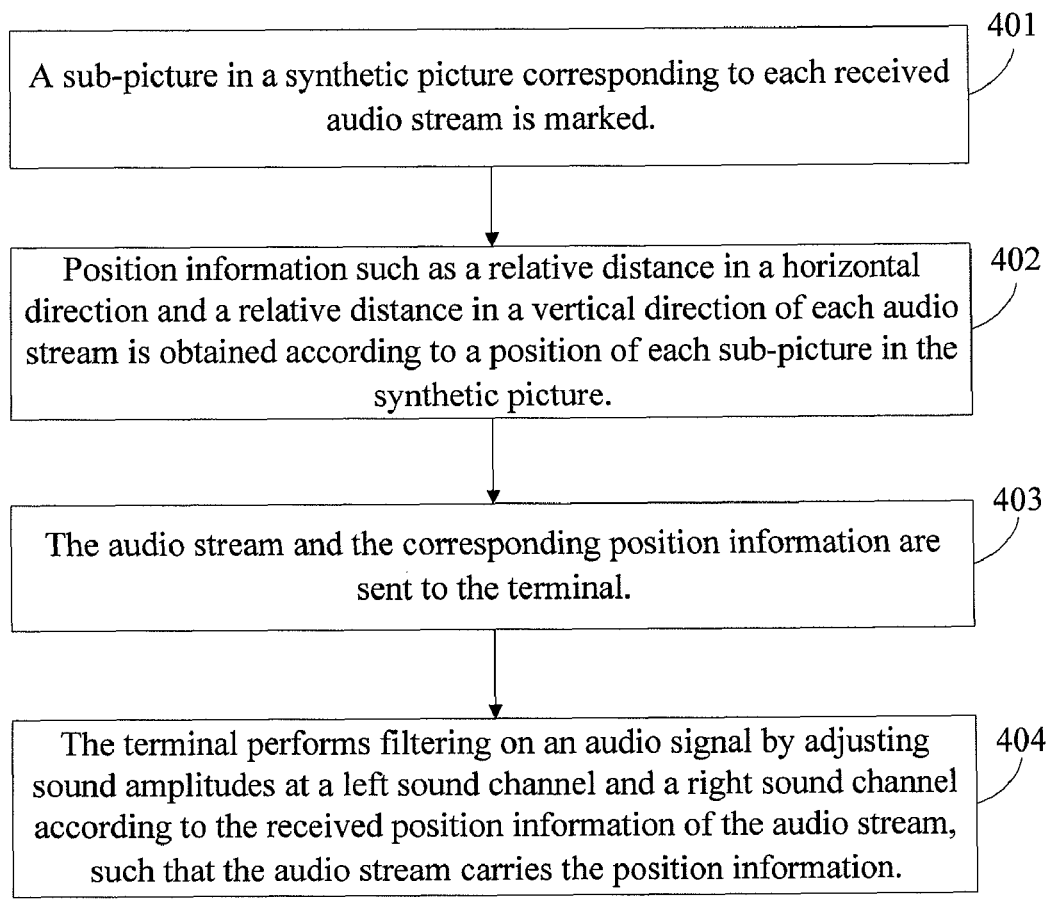
FIG. 7 is a flow chart of a method according to a third embodiment of the present invention.

FIG. 7 is a flow chart of a method according to a third embodiment of the present invention.

In step 401, a sub-picture in a synthetic picture corresponding to each received audio stream is marked. The received audio streams and the synthetic picture are demonstrated below by examples.

In Example 1, a video stream that the MCU sends to the first terminal is a synthetic picture of the second terminal and the third terminal, in which the second terminal is at a left sub-picture and the third terminal is at a right sub-picture. An audio stream that the MCU sends to the first terminal includes an audio stream of the second terminal and an audio stream of the third terminal, in which the audio stream for marking the second terminal corresponds to the left sub-picture and the audio stream of the third terminal corresponds to the right sub-picture. In Example 2, a video stream that the MCU sends to the second terminal is a synthetic picture of the second terminal and the third terminal. An audio stream that the MCU sends to the second terminal includes an audio stream of the first terminal and an audio stream of the third terminal, in which the audio stream for marking the third terminal corresponds to the right sub-picture, but the audio stream of the first terminal has no corresponding sub-picture, and the audio stream for marking the first terminal is voiceover or serves as other marks except the voiceover. For example, the audio stream is marked as an audio stream when no picture is displayed.

In Example 3, a video stream that the MCU sends to the third terminal is the video stream of the second terminal. An audio stream that the MCU sends to the third terminal includes the audio stream of the first terminal and the audio stream of the second terminal. Thus, the third terminal watches a single picture of the second terminal. The single picture is regarded as a special case for the synthetic picture. The audio stream for marking the second terminal corresponds to the single picture and the audio stream of the first terminal is marked as voiceover.

In step 402, position information such as a relative distance in a horizontal direction and a relative distance in a vertical direction of each audio stream is obtained according to a position of each sub-picture in the synthetic picture. The representation manner of the relative distances is as shown in FIG. 4. The audio stream that participates in the audio mixing carries no position information itself. The point o is a central point of a video image, w is a width of the image, and h is a height of the image. A coordinate system is established with the point o as an origin. Thus, the point M in the image has coordinates (w0, h0). The w' and h' represent relative distances of the point M in the horizontal direction and in the vertical direction respectively, and the following equations may be adopted for calculation.

$$w'=w0/(w/2) \tag{1}$$

$$h'=h0/(h/2) \tag{2}$$

An audio stream sent to a terminal 1 is a mixed audio of a terminal 2 and a terminal 3, in which an audio stream of the terminal 2 that participates in the audio mixing corresponds to a left sub-picture, and an audio stream of the terminal 3 that participates in the audio mixing corresponds to a right sub-picture. The central point of the left sub-picture is C1 and the central point of the right sub-picture is C2. Therefore, position information of the audio streams of the terminal 2 and the terminal 3 may be represented by relative distances of the points C1 and C2 in the horizontal direction and in the vertical direction respectively. That is, the position information of the audio stream of the terminal 2 is (−0.5, 0), and the position information of the audio stream of the terminal 3 is (0.5, 0). In a previous step, voiceover is mentioned. For the audio stream serving as the voiceover, the position information thereof may be set as (−1, 0) or (1, 0). For the audio stream corresponding to the single picture, the position information thereof is (0, 0). If the audio stream that participates in the audio mixing carries position information, the position information is calculated in the following manner. Assume that the audio streams of the terminal 2 and the terminal 3 are mixed and respectively correspond to the left sub-picture and the right sub-picture, and the position information of the audio streams of the terminal 2 and the terminal 3 themselves are (w'2, h'2) and (w'3, h'3) respectively. The new position information thereof should be (−0.5+(w'2/2), h'2) and (0.5+(w'3/2), h'3).

In step 403, the audio stream and the corresponding position information are sent to the terminal. For example, the audio stream sent to the first terminal includes the audio stream of the second terminal and the audio stream of the third terminal. The audio stream of the second terminal is placed at a first sound channel. The audio stream of the third terminal is placed at a second sound channel. In addition, if the MCU sends a large amount of audio streams to a certain terminal, to reduce a code rate, the audio stream having the highest energy is placed at a first sound channel, and the audio stream having the second highest energy is placed at a second sound channel, and then the other audio streams are decoded, audio mixed, and encoded into one audio stream for being placed at a third sound channel.

The position information may be sent to the terminal directly or transferred to an audio stream combining unit. The audio stream combining unit inserts the position information in the audio stream, so that the position information is sent to the terminal together with the audio stream.

In step 404, the terminal performs filtering on an audio signal by adjusting sound amplitudes at a left sound channel and a right sound channel according to the received position information of the audio stream, so that the audio stream carries the position information. For example, the specific adjusting manners are described through the following two equations.

$$w'=(g1-g2)/(g1+g2) \tag{1}$$

$$c=g1*g1+g2*g2 \tag{2}$$

In Equations (1) and (2), c is a constant value, g1 is a sound intensity gain of the left sound channel, g2 is a sound intensity gain of the right sound channel, and w' is a relative distance in a horizontal direction calculated according to step 304.

In this embodiment, the position information is represented by a relative distance in a horizontal direction and a relative distance in a vertical direction. The filtering is performed by adjusting amplitudes of a left sound channel and a right sound channel.

The flow charts of the method according to the embodiments of the present invention have been described above. The schematic diagrams of the system according to the embodiments of the present invention are described as follows.

Figure 8:
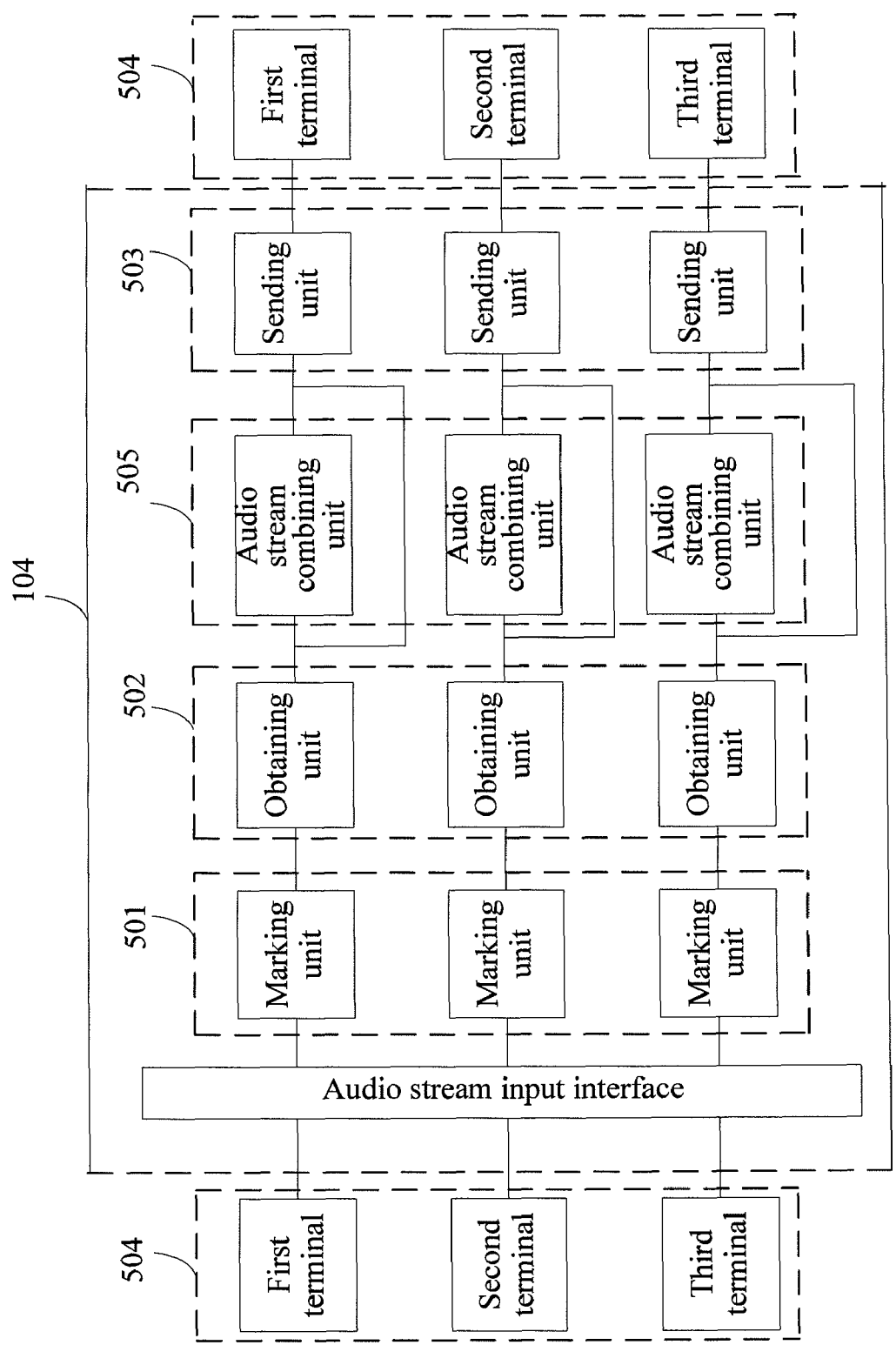
FIG. 8 is a diagrammatic sketch of a system according to an embodiment of the present invention.

FIG. 8 is a diagrammatic sketch of a system according to an embodiment of the present invention. The system includes a marking unit 501, an obtaining unit 502, a sending unit 503, and a terminal unit 504.

The marking unit 501 is adapted to mark a sub-picture in a synthetic picture corresponding to each received audio stream. For example, an audio stream input interface of an MCU 104 receives an audio stream from each terminal and transmits the audio stream to the marking unit 501 corresponding to each receiving terminal.

The obtaining unit 502 is adapted to obtain position information of each audio stream according to a position of each sub-picture in the synthetic picture. For example, an angle in a horizontal direction and an angle in a vertical direction of each audio stream are obtained, or a relative distance in the horizontal direction and a relative distance in the vertical direction of each audio stream are obtained.

The sending unit 503 is adapted to send the audio stream and the corresponding position information. For example, the audio stream sent to the first terminal includes the audio stream of the second terminal and the audio stream of the third terminal. The audio stream of the second terminal is placed at a first sound channel, and the audio stream of the third terminal is placed at a second sound channel. In addition, if a large amount of audio streams need to be sent to a certain terminal, to reduce a code rate, the audio stream having the highest energy is placed at a first sound channel, and the audio stream having the second highest energy is placed at a second sound channel, and then the other audio streams are decoded, audio mixed, and encoded into one audio stream for being placed at a third sound channel.

The terminal unit 504 is adapted to process an audio signal according to the received position information, so that the audio stream carries the position information. For example, the filtering operation is performed by adjusting sound intensity at a left sound channel and a right sound channel, or through an HRTF technology.

The system further includes an audio stream combining unit 505.

The audio stream combining unit 505 is adapted to insert the position information in the audio stream and send the audio stream to the sending unit 503.

Figure 9:
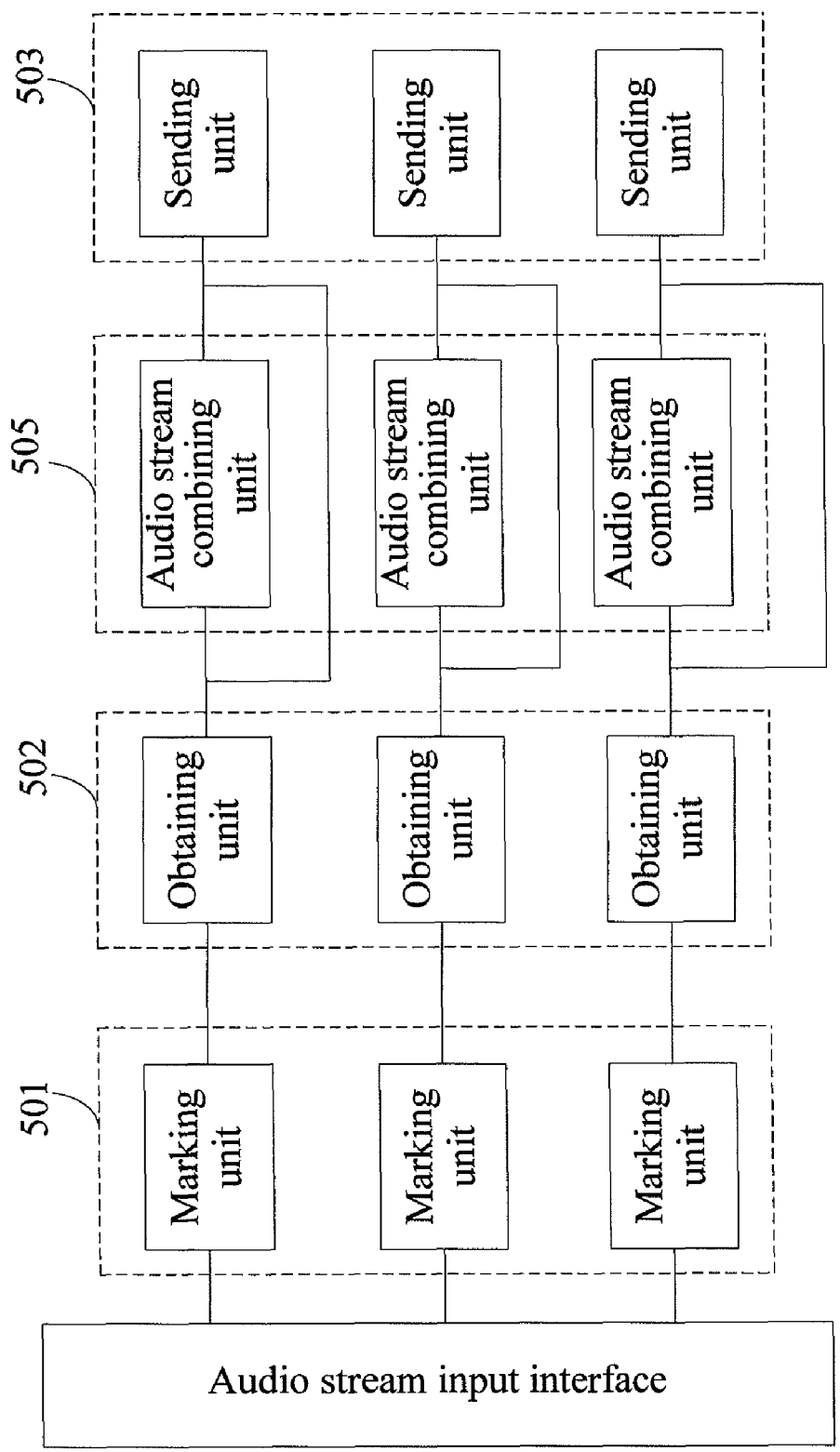
FIG. 9 is a diagrammatic sketch of a device according to an embodiment of the present invention.

FIG. 9 is a diagrammatic sketch of a device according to an embodiment of the present invention. The device includes a marking unit 501, an obtaining unit 502, and a sending unit 503.

The marking unit 501 is adapted to mark a sub-picture in a synthetic picture corresponding to each received audio stream. For example, an audio stream input interface of an MCU 104 receives an audio stream from each terminal and transmits the audio stream to the marking unit 501 corresponding to each receiving terminal.

The obtaining unit 502 is adapted to obtain position information of each audio stream according to a position of each sub-picture in the synthetic picture. For example, an angle in a horizontal direction and an angle in a vertical direction of each audio stream are obtained, or a relative distance in the horizontal direction and a relative distance in the vertical direction of each audio stream are obtained.

The sending unit 503 is adapted to send the audio stream and the corresponding position information. For example, the audio stream sent to the first terminal includes the audio stream of the second terminal and the audio stream of the third terminal. The audio stream of the second terminal is placed at a first sound channel, and the audio stream of the third terminal is placed at a second sound channel. In addition, if a large amount of audio streams need to be sent to a certain terminal, to reduce a code rate, the audio stream having the highest energy is placed at a first sound channel, and the audio stream having the second highest energy is placed at a second sound channel, and then the other audio streams are decoded, audio mixed, and encoded into one audio stream for being placed at a third sound channel.

The device further includes an audio stream combining unit 505.

The audio stream combining unit 505 is adapted to insert the position information in the audio stream and send the audio stream to the sending unit 503.

As seen from the foregoing embodiments, the sub-picture in the synthetic picture corresponding to each received audio stream is marked, the position information of each audio stream is obtained, and the audio stream and the corresponding position information are sent to the terminal. Therefore, the configuration situation of loudspeakers in the terminal does not need to be known. The terminal processes the audio signal according to the received position information of the audio stream, so that the audio stream carries the position information. Thus, the close relationship between the MCU and the terminal is reduced and the flexibility is improved.

Persons of ordinary skill in the art should understand that, all or part of the steps in the method according to the embodiments of the present invention may be implemented by a program instructing relevant hardware. The program may be stored in a computer readable storage medium.

The storage medium may be a read only memory (ROM), a magnetic disk, or an optical disk.

The method, system, and device of video communication of the present invention have been described in detail. Persons of ordinary skill in the art can make variations and modifications to the present invention in terms of the specific implementations and application scopes according to the ideas of the present invention. Therefore, the specification shall not be construed as a limit to the present invention.

What is claimed is:

1. A method of video communication, comprising:
   marking a sub-picture in a synthetic picture corresponding to each received audio stream;
   obtaining position information of each audio stream according to a position of each sub-picture in the synthetic picture; and
   sending each audio stream and the corresponding position information to a terminal, and processing, by the terminal, a respective audio signal according to the received position information and the respective audio stream, so that the respective audio stream carries the corresponding position information, wherein the marking the sub-picture in the synthetic picture corresponding to each received audio stream further comprises: when any one of the audio streams has no corresponding sub-picture in the synthetic picture, marking the one audio stream as voiceover.

2. The method according to claim 1, wherein the marking the sub-picture in the synthetic picture corresponding to each received audio stream further comprises:
   when any one of the audio streams has a corresponding sub-picture in the synthetic picture, marking the one audio stream to correspond to the corresponding sub-picture.

3. The method according to claim 1, wherein the marking the sub-picture in the synthetic picture corresponding to each received audio stream further comprises:
when a single picture corresponding to any one of the audio streams is received, marking the one audio stream to correspond to the single picture and marking each of the other audio streams as voiceover.

4. The method according to claim 1, wherein the respective position information of each of the audio streams further comprises:
an angle in a horizontal direction and an angle in a vertical direction.

5. The method according to claim 1, wherein the respective position information of each of the audio streams further comprises:
a relative distance in a horizontal direction and a relative distance in a vertical direction.

6. The method according to claim 1, wherein the processing the respective audio signal further comprises:
processing by adjusting sound intensity at a left sound channel and a right sound channel.

7. The method according to claim 1, wherein the processing the respective audio signal further comprises:
filtering through a head related transfer function (HRTF).

8. A system of video communication, comprising:
a marking unit adapted to mark a sub-picture in a synthetic picture corresponding to each received audio stream;
an obtaining unit adapted to obtain position information of each audio stream according to a position of each sub-picture in the synthetic picture;
a sending unit adapted to send each audio stream and the corresponding position information; and
a terminal unit adapted to process a respective audio signal according to the received position information, so that the respective audio stream carries the corresponding position information, wherein the marking unit adapted to mark the sub-picture in the synthetic picture corresponding to each received audio stream further comprises: when any one of the audio streams has no corresponding sub-picture in the synthetic picture, marking the one audio stream as voiceover.

9. The system according to claim 8, further comprising:
an audio stream combining unit adapted to insert the corresponding position information in the respective audio stream and send the audio stream to the sending unit.

10. A device for video communication, comprising:
a marking unit adapted to mark a sub-picture in a synthetic picture corresponding to each received audio stream;
an obtaining unit adapted to obtain position information of each audio stream according to a position of each sub-picture in the synthetic picture; and
a sending unit adapted to send each audio stream and the corresponding position information, wherein the marking unit adapted to mark the sub-picture in the synthetic picture corresponding to each received audio stream further comprises: when any one of the audio streams has no corresponding sub-picture in the synthetic picture, marking the one audio stream as voiceover.

11. The device according to claim 10, further comprising:
an audio stream combining unit adapted to insert the corresponding position information in the respective audio stream and send the audio stream to the sending unit.

12. A method of video communication, comprising:
marking a sub-picture in a synthetic picture corresponding to each received audio stream;
obtaining position information of each audio stream according to a position of each sub-picture in the synthetic picture, wherein the position information of the audio stream further comprises: an angle in a horizontal direction and an angle in a vertical direction or a relative distance in a horizontal direction and a relative distance in a vertical direction; and
sending the audio stream and the corresponding position information to a terminal, and processing, by the terminal, an audio signal according to the received position information and the audio stream, so that the audio stream carries the position information, wherein the marking the sub-picture in the synthetic picture corresponding to each received audio stream further comprises: when any one of the audio streams has no corresponding sub-picture in the synthetic picture, marking the one audio stream as voiceover.

* * * * *

UNITED STATES PATENT AND TRADEMARK OFFICE
CERTIFICATE OF CORRECTION

| | |
|---|---|
| PATENT NO. | : 8,259,625 B2 |
| APPLICATION NO. | : 12/732999 |
| DATED | : September 4, 2012 |
| INVENTOR(S) | : Wuzhou Zhan |

It is certified that error appears in the above-identified patent and that said Letters Patent is hereby corrected as shown below:

On the Title Page

Left column, item (73), replace "Huawei Technologies Co., Ltd.," with --Huawei Device Co., Ltd.,--.

Right column, item (56), under "FOREIGN PATENT DOCUMENTS", insert:

--China    2805011 Y    August 9, 2006
  China    1901663 A    January 24, 2007--.

Signed and Sealed this
Eighth Day of October, 2013

Teresa Stanek Rea
*Deputy Director of the United States Patent and Trademark Office*